(12) United States Patent
Nikovski et al.

(10) Patent No.: US 9,170,119 B2
(45) Date of Patent: Oct. 27, 2015

(54) METHOD AND SYSTEM FOR DYNAMICALLY ADAPTING USER INTERFACES IN VEHICLE NAVIGATION SYSTEMS TO MINIMIZE INTERACTION COMPLEXITY

(71) Applicant: Mitsubishi Electric Research Laboratories, Inc., Cambridge, MA (US)

(72) Inventors: Daniel Nikolaev Nikovski, Brookline, MA (US); John R Hershey, Winchester, MA (US); Bret Harsham, Newton, MA (US); Jonathan Le Roux, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 23 days.

(21) Appl. No.: 14/035,502

(22) Filed: Sep. 24, 2013

(65) Prior Publication Data
US 2015/0088422 A1    Mar. 26, 2015

(51) Int. Cl.
*G08G 1/123*    (2006.01)
*G01C 21/36*    (2006.01)
*G06K 9/62*    (2006.01)

(52) U.S. Cl.
CPC ............ *G01C 21/36* (2013.01); *G01C 21/3617* (2013.01); *G06K 9/6277* (2013.01)

(58) Field of Classification Search
CPC .................. G06N 5/02; G06F 17/30241
USPC ............................ 701/538, 301, 117, 532, 24
See application file for complete search history.

(56) References Cited

U.S. PATENT DOCUMENTS

| 6,349,257 | B1 | 2/2002 | Liu et al. |
| 8,078,359 | B2 | 12/2011 | Small |
| 8,386,173 | B2 | 2/2013 | Muzina |
| 2006/0229802 | A1 | 10/2006 | Vertelney et al. |
| 2013/0096819 | A1 | 4/2013 | Tarnok |
| 2013/0246017 | A1 | 9/2013 | Heckerman et al. |
| 2013/0295963 | A1* | 11/2013 | Sen ............................ 455/456.3 |
| 2013/0345957 | A1* | 12/2013 | Yang et al. .................... 701/300 |

FOREIGN PATENT DOCUMENTS

EP    1742145 A1    1/2007

OTHER PUBLICATIONS

Rakthanmanon et al., "Fast-Shapelets: A Scalable Procedure for Discovering Time Series Shapelets," SDM 2013.
Hall, et al., "The WEKA Data Mining Software: An Update; SIGKDD Explorations," vol. 11, Issue 1, 2009.

* cited by examiner

*Primary Examiner* — Thomas G Black
*Assistant Examiner* — Luke Huynh
(74) *Attorney, Agent, or Firm* — Dirk Brinkman; Gene Vinokur

(57) ABSTRACT

A method adapts a user interface of a vehicle navigation system. Based on an input vector representing a current state related to the vehicle, probabilities of actions are predicted to achieve a next state using a predictive model representing previous states. Then, a subset of the actions with highest probabilities that minimize a complexity of interacting with the vehicle navigation system are displayed in the vehicle.

16 Claims, 1 Drawing Sheet

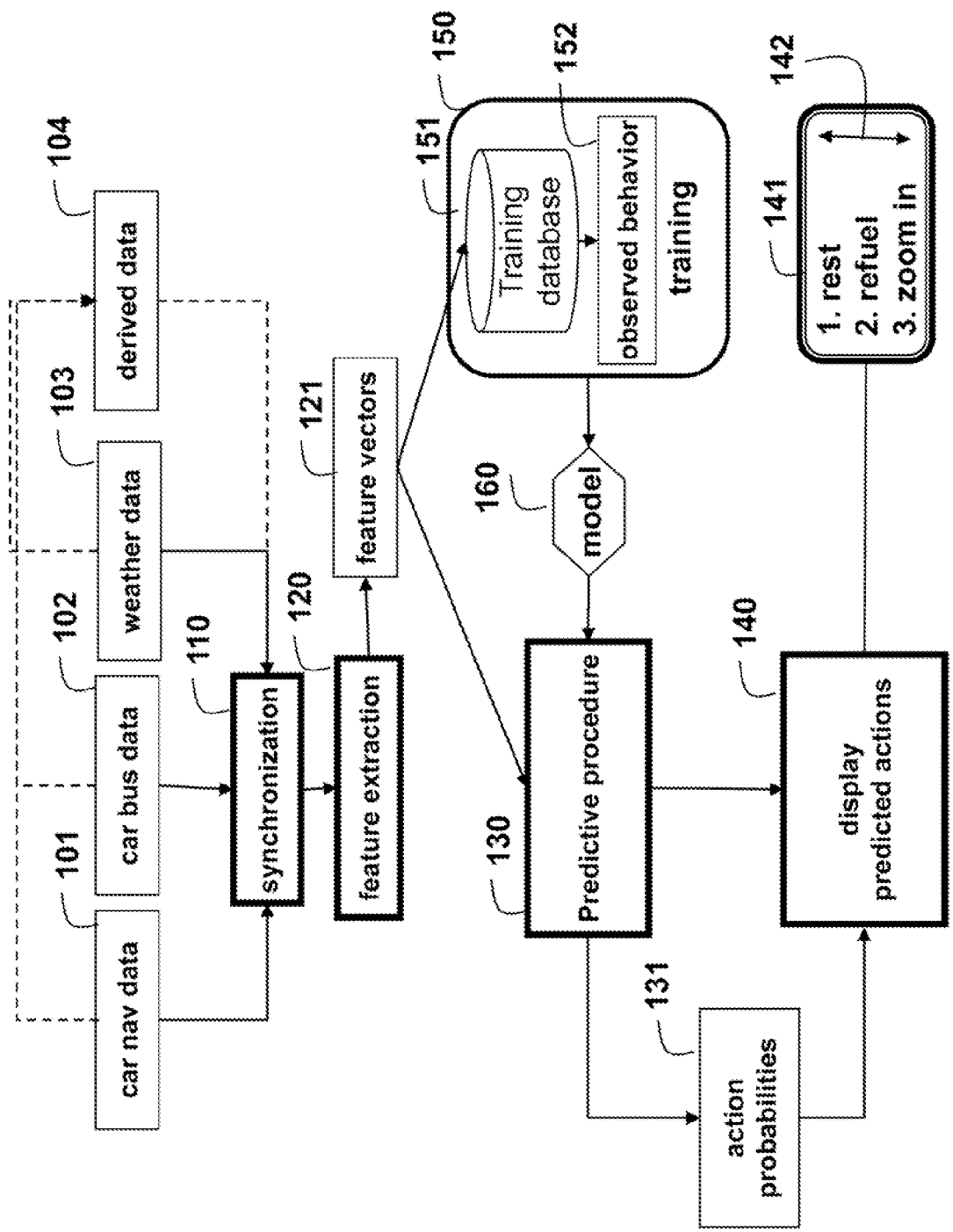

METHOD AND SYSTEM FOR DYNAMICALLY ADAPTING USER INTERFACES IN VEHICLE NAVIGATION SYSTEMS TO MINIMIZE INTERACTION COMPLEXITY

FIELD OF THE INVENTION

The invention relates to vehicle navigation systems, and more particularly to adapting user interfaces in the vehicle navigation systems.

BACKGROUND OF THE INVENTION

Navigation systems can be embedded in cars, trucks, buses, and other vehicles. The navigation systems can advise the operator, and any other occupants of the vehicle, about an optimal route from a current location to a destination. The destination is usually specified before a trip starts. Voice prompts about required maneuvers, e.g., turns and lane changes, etc, are usually given at the correct times, and this can significantly reduce the cognitive load and distractions of the operator by minimizing the need to locate traffic signs, and remember the route. In this capacity, vehicle navigation systems also act as safety devices that can significantly reduce the risks of accidents.

Many vehicle navigation systems offer additional actions, such as requesting information about points of interest, adjusting thermal environments, operating entertainment devices, dialing telephone numbers, customizing graphical output such as maps in a variety of ways, e.g., zoom in and out, switching between 2D and 3D maps, align the map orientation with the direction of travel or with a compass directions, etc. It is also possible to change the intended destination. All of these additional actions typically require interaction with the vehicle navigation system while operating the vehicle. This interaction can increase the risk of accidents by orders of magnitude.

One lengthy interaction is setting a different destination. This requires specifying multiple components, e.g., country, state, city, street, number, etc., each of which needs multiple keystrokes on a keypad or multiple touches on the user interface. Typically, these interfaces are relatively small, and are located out of the dominant line of sight for the operator. As a result, such systems can be significant safety hazards, defeating one of their original purposes, to reduce distraction and risk of accidents while driving.

Manufacturers of vehicle navigation systems are addressing this problem by carefully organizing, the available actions using a sequence of menus, such that the most often used actions can be specified with a minimal number of interactions.

For example, some vehicle navigation systems have a dedicated HOME item on a top-level menu. The HOME item can be preset to, e.g., the address of the home or work place of the operator. Similarly, a preset CALL HOME item can dial the most frequently dialed telephone number.

While such careful design of the available menu sequences can significantly shorten the number of keystrokes needed to complete an interaction, those designs do not consider a significant variability between the relative frequency of use of individual actions for different operators, nor are the designs specific to the current context of the vehicle and operator, as described by, e.g., location, time of the day, state of the engine, and inside environmental conditions, etc. In many situations, a large number of the available actions are either not applicable or not likely, for example, it is not likely that the HOME item would be used when the vehicle is at its home location, and the top-level placement of this button could better be used for some other action. The personalization of the user interface of vehicle navigation systems is one possible approach to optimizing the user experience and minimizing the risk of accident.

Muzina et al., in U.S. Pat. No. 8,386,173, describe a method for automatic adjusting a level of map detail based on the vehicle speed, thus minimizing the number × the operator zooms in or out of the map.

Liu et al., in U.S. Pat. No. 6,349,257, describe a system for personalizing the user interface of a vehicle navigation device in advance of a trip, for example at a vehicle rental agency. That personalization can be useful by eliminating interface elements that are not necessary for a particular trip. Predefined destination points are likely to eliminate distraction en route.

Evan et al. in U.S. Pat. No. 8,078,359, describe a method for the personalization of the user interface of a vehicle navigation and infotainment system by means of interacting with a touch screen. However, that general approach to personalization requires extra time and advance planning, and is only operator-specific, and not context-specific.

SUMMARY OF THE INVENTION

The embodiments of the invention provide a method for adapting dynamically a user interface of a vehicle navigation system. The method can modify a list of actions available to the operator according to a current state related to the vehicle. Although other occupants of the vehicle can also use the system, the focus of the invention is on minimizing the complexity of the interaction for the vehicle operator, for example, the time and/or number of keystrokes or touches.

Therefore, the method addresses the problem of excessively complex interaction by the user with the vehicle navigation system, e.g., as measured by the number of keystrokes or touches necessary to complete the selection of an action, and significantly decreases the risk of accidents.

The method generates a menu of action items that correspond to intended tasks that the user might want to select, such that the most likely action for a current state can be selected with the smallest number of keystrokes or touches. The menu can be displayed either on a main display device of the navigation system, replacing a conventional type static menu, or can be shown on an auxiliary display device with a smaller number of selectable actions.

The method determines the actions to include in the adaptable menu by evaluating a probability that the user is likely to select the associated action based on recorded information and a current state related to the vehicle.

The method periodically acquires state information (data) from the vehicle navigation system, the engine, external databases accessible by wireless communication, and oilier publicly available meteorological services that report air temperature, humidity, cloud cover, and rain or snow fall, visibility, traffic patterns, emergency information, and the like. The data are organized in a database, and at periodic intervals, all the available data up to the current moment, is used to construct a predictive model that relates the current state at the time the user needs to select an action. Likely actions to display are selected by the vehicle navigation system, which includes a display device to show the likely actions. The current state is represented as a vector of input data of a known dimension. The likely actions are a subset of all possible actions.

Machine learning procedures are used to establish a relationship between input variables (states) and an output variable (action). The relations are established during an (off-line) training phase.

During a run-time phase, a vector of the current state is periodically constructed, identically to the way the vectors were constructed during the training phase, and the predictive model is used to predict the probability that each of the available actions would be selected by the user, while minimizing the complexity of the interactions.

After a probability for selection is assigned to each available action, the menu is constructed so as to minimize the expected number of keystrokes or touches necessary for the user to select the intended action. This menu is periodically updated, so as to match the current state related to the vehicle, and possibly adapted to the varying needs and intentions of the operator/user over time.

BRIEF DESCRIPTION OF THE DRAWINGS

FIG. 1 is a block diagram of a system and method for adapting dynamically a user interface of a vehicle navigation system according to embodiments of the invention.

DETAILED DESCRIPTION OF THE PREFERRED EMBODIMENTS

System Overview

As shown in FIG. 1, the embodiments of the invention provide a method for adapting dynamically a user interface of a vehicle navigation. The system can acquire navigation data, 101, vehicle data 102, environmental data 103, and any other data that is related to a state of the vehicle. Generally, the state of the vehicle includes any significant information related to external and internal states of the vehicle, and its occupants. The vehicle data can be obtained from controller area network (CAN) in the vehicle that enables microcontrollers and devices to communicate with each other within the vehicle without a host processor.

The data or state information can be acquired locally from sensors in the vehicle, user input, or via a wireless connection to a network, such as the Internet connected to databases. The data can include historical as well as real-time data.

After the data are synchronized 110, feature vectors 121 can be extracted 120 periodically. Each feature vector corresponds to a state related to the vehicle, as defined above, at a particular time. The feature vectors are then input into a predictive model constructed from feature vectors stored in a historical database, 151, acquired and processed in a similar manner during an off-line process.

A predictive procedure 130 is applied to an observed behavior 152 of the user/operator to determine probabilities of actions 131.

A set of high probability actions 141 are displayed 140 so that the operator can select an action with a minimal number of interactions with the system in a smallest amount of time to reduce the risk of accidents. In other words, the complexity of the interactions is minimized.

Predictive Model

The main component of the invention is a predictive model 160 that relates a current state to a next state using previous states. Herein, the current states of the model can include conditions and locations of the vehicle, operator conditions, and external factors, such as weather and traffic situation, etc.

The output of the model is what the operator is predicted to do next, based on previous states stored in the database 150.

To solve this prediction problem using machine learning methods, it is useful to reduce the available data to a format that can be used by various machine learning procedures. This format includes pairs (x, y), where $x=[x_1, x_2, \ldots, x_N]^T$ is an input vector of fixed dimension N, and y is an output variable that can be either single dimensional (scalar, Boolean, or multinomial), or a vector of finite dimension P, $y=[y_1, y_2, \ldots, y_P]^T$, where the component $y_j$, j=1, ..., P of this vector can be of any of those types. An entire data set consists of M such pairs $(x^{(k)}, y^{(k)})$, k=1, M. A transpose operator is indicated by T.

One possible input vector x includes the most recently measured data related to the current state, e.g., vehicle speed, location, time of the day, day of the week, remaining fuel, battery charge, inside and outside environmental conditions, such as temperature, visibility, time of the day, day of the week, etc.

This input is suitable for directly predicting user actions that are only dependent on one or more of the acquired data, and that do not require any further user interaction, for example a decision to locate a gas or charging station, or adjusting the environment inside the vehicle.

The input vector x constructed in this manner is likely to characterize some of the causal relationships affecting user actions, but may be insufficient for an accurate prediction of other actions. For example, predicting that the operator is looking for a rest area, requires knowledge of how long the operator has been driving since the last stop. This information is not directly measurable by any vehicle system.

A corresponding derived input variable can be constructed from the directly measurable information, along with other such variables that act as a "memory" of the driving process. Such variable data 104 are also sometimes called derived input features. Regarding the memory about the most recent stop, there are a number of possible ways to generate the derived features.

One feature is a time difference between a current time and a time of the last stop. Another way is to generate a set of Boolean indicator features, whose value is true when the last stop occurred within a time less than a specified threshold, e.g., one hour for one indicator variable, two hours for a second variable, etc. The same general approach can be followed to generate derived features related to other events, for example expected arrival at the destination. Such a derived feature can be useful in predicting whether the operator should start to look for a parking place, zoom in on a map, etc.

Another set of very important derived variables are related to events directly corresponding to user actions. One example of such a variable is whether an action $a_j$ occurred within the last T minutes. Such variables can be highly predictive of other user actions, particularly in cases when user actions always occur in the same sequence.

For example, some operators may like to see the entire route immediately after the destination is specified, and the action of zooming out the map to the entire route can be displayed on the user interface immediately after the action of setting the destination has occurred, when such a sequence can be learned during training.

Thus, another suitable representation augments the set of derived features with scalar variables or Boolean indicator variables. This representation is likely to increase the accuracy of the predicting. However, the set of derived features represents only a small fraction of the past information that can be of use to the predictive procedure. Supplying that entire information to the learning procedure is not practical, even when it is limited to finite differences between the current state and previous states, because the number of dimensions of the input vector would become very high. This is known to impair the generalization ability of the learned model.

One possible way to address this problem is to search for a limited number of short sub-sequences of previous states in the entire set of time series, with the property that these subsequences are highly predictive of the output variable that needs to be predicted. Such subsequences are known as motifs or shapelets, and can be discovered in the entire set of time series by means of computationally efficient procedures.

During the training phase, a search procedure analyzes the entire set of time series, discovers the highly predictive sub-sequences (HPS), and constructs a Boolean indicator variable $x_i$ for each. The input vector augmented by such HPS indicator variables constitutes another possible input representation.

There are a number of possible ways for encoding of an output variable y, depending on what kind of operator actions are modeled and predicted. When the selected actions are mutually exclusive, and when the operator is selecting action $a_1$, this means explicitly that the operator does not want to select action $a_2$. A suitable probability distribution for the variable y is a multinomial distribution, that is, $y \in \{a_1, a_2, \ldots, a_L\}$. Examples for such mutually exclusive actions are turning on the heating and cooling functions of the vehicle environmental systems, along with not selecting any of the actions, because the temperature is currently comfortable.

When the actions available are not mutually exclusive, it can be more appropriate to represent the output as a vector $y=[y_1, y_2, \ldots, y_P]^T$ of Boolean variables, where P is equal to the number of actions.

Regardless of the selected input and output representations, the next step of the method is to learn the predictive model 160 from the data set of M training examples ($x^{(k)}$, $y^{(k)}$), k=1, M in the database 151. Some methods for learning such a model include logistic regression, decision trees, naïve Bayes networks, support vector machines, etc.

After the model is learned and presented with the input vector x, the model is used to estimate the probability $p_j$ that a particular action $a_j$, j=1, P will be selected.

To adapt the user interface dynamically, the learned predictive model is processed periodically, for example every minute, or on demand on the available measured data. An input vector x is constructed identically to the way input vectors were constructed when preparing the training data set, and the predictive model is used to produce the probabilities $p_j$.

After that, the actions $a_j$ are sorted in descending order according to the estimated probabilities $p_j$ that the operator will select a small subset of the highest probability actions, for example, three or four.

This list can be displayed 140 on a display device 141, e.g., the main display device of the vehicle navigation system, or on an auxiliary display device, or both. A scroll interface 142 can be used for advancing the list to a set of next probable actions, in case the action that the operator wants to select is not on the displayed list.

When a hierarchy (tree) of the possible actions $a_j$, j=1, P is available, the tree can be used for the display of the short list to minimize the complexity of the interactions required to selecting the intended action. For example, if actions $a_1$=Map_zoom_in and $a_2$=Map_zoom_out" belong to the same general category $c_1$=Map_manipulation, and both are equally likely, for example, because the user just performed one of the actions, this suggests that the user is dissatisfied with the current zoom level. The general selection of $c_1$ can be placed at a top level, instead of using two slots for $a_1$ and $a_2$.

The training phase can be performed at periodic intervals, or on demand. This kind of training of the predictive model retains current states when the preferred actions change, for example due to a change in workplace, residences, seasons, etc.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for adapting a user interface of a vehicle navigation system in a vehicle, comprising the steps:
    predicting, based on an input vector representing a current state related to the vehicle, probabilities of actions to achieve a next state using a predictive model representing previous states, wherein the input vector is $x=[x_1, x_2, \ldots, X_N]^T$ of N dimensions, wherein T is a transpose operator; and
    displaying, in the vehicle, on the user interface to adapt the user interface, a subset of the actions with highest probabilities that minimize a complexity of interacting with the vehicle navigation system using the user interface as adapted, and wherein the actions are a vector $y=[y_1, y_2, \ldots, y_P]^T$ of P Boolean variables.

2. The method of claim 1, wherein the displaying is on a main display device of the vehicle navigation system.

3. The method of claim 1, wherein the input vector is acquired periodically, and the displaying is updated periodically.

4. The method of claim 1, wherein the current state includes information related to external states and internal states of the vehicle.

5. The method of claim 4, wherein the external states include a location, time, traffic, and external environment information, and the internal state includes vehicle operational measurements, internal environment, and operator information.

6. The method of claim 5, wherein the external information is acquired via wireless communication with external databases.

7. The method of claim 4, further comprising:
    synchronizing the information; and
    extracting the input vector after the synchronizing.

8. The method of claim 1, wherein the predictive model relates the current state to a next to be performed using the previous states.

9. The method of claim 1, further comprising:
    organizing and displaying the actions hierarchically as a tree.

10. The method of claim 1, wherein some actions are directly related to the input vector using derived input features.

11. The method of claim 1, wherein the probabilities of the actions are based on a time difference between the current state and the previous states.

12. The method of claim 1, wherein the prediction is based on highly predictive sub-sequences of previous states series.

13. The method of claim 1, wherein the predicting considers mutually exclusive actions.

14. The method of claim 1, further comprising:
    learning the previous states during a training phase using training vectors.

15. The method of claim 14, wherein the learning uses logistic regression, decision trees, naïve Bayes networks, or support vector machines.

16. The method of claim 14, wherein the learning is performed periodically.

* * * * *